(12) United States Patent
Yasuhara et al.

(10) Patent No.: US 6,627,103 B2
(45) Date of Patent: Sep. 30, 2003

(54) MN-ZN FERRITE PRODUCTION PROCESS, MN-ZN FERRITE, AND FERRITE CORE FOR POWER SUPPLIES

(75) Inventors: Katsushi Yasuhara, Chuo-ku (JP); Kenya Takagawa, Chuo-ku (JP)

(73) Assignee: TDK Corporation, Tokyo (JP)

( * ) Notice: Subject to any disclaimer, the term of this patent is extended or adjusted under 35 U.S.C. 154(b) by 281 days.

(21) Appl. No.: 09/808,998

(22) Filed: Mar. 16, 2001

(65) Prior Publication Data

US 2002/0009413 A1 Jan. 24, 2002

(30) Foreign Application Priority Data

Mar. 31, 2000 (JP) .................................. 2000-096885
Jan. 10, 2001 (JP) .................................. 2001-002772

(51) Int. Cl.$^7$ ............................................. H01F 1/34
(52) U.S. Cl. ................................. 252/62.62; 264/613
(58) Field of Search ....................... 252/62.62; 264/613

(56) References Cited

U.S. PATENT DOCUMENTS

| | | | | |
|---|---|---|---|---|
| 3,567,641 | A | 3/1971 | Ross et al. ............... | 252/62.59 |
| 5,846,448 | A | * 12/1998 | Yasuhara et al. ......... | 252/62.56 |
| 6,402,979 | B1 | * 6/2002 | Saita et al. .............. | 252/62.62 |
| 6,458,286 | B1 | * 10/2002 | Takagawa et al. ........ | 252/62.62 |

FOREIGN PATENT DOCUMENTS

| | | |
|---|---|---|
| DE | 1 089 317 | 9/1960 |
| EP | 0 797 222 | 9/1997 |
| EP | 1 030 318 | 8/2000 |
| JP | 46-2880 | 10/1971 |
| JP | 48-72696 | 10/1973 |
| JP | 60-262404 | 12/1985 |
| JP | 61-108109 | 5/1986 |
| JP | 61-252609 | 11/1986 |
| JP | 61-252611 | 11/1986 |
| JP | 63-222018 | 9/1988 |
| JP | 1-129403 | 5/1989 |
| JP | 2-54902 | 2/1990 |
| JP | 3-141611 | 6/1991 |
| JP | 3-163804 | 7/1991 |
| JP | 3-223119 | 10/1991 |
| JP | 3-248403 | 11/1991 |
| JP | 3-248404 | 11/1991 |
| JP | 3-248405 | 11/1991 |
| JP | 3-254103 | 11/1991 |
| JP | 4-55362 | 2/1992 |
| JP | 4-150007 | 5/1992 |
| JP | 5-198416 | 8/1993 |
| JP | 5-267040 | 10/1993 |
| JP | 6-5411 | 1/1994 |
| JP | 8-169756 | 7/1996 |

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

The invention provides a manganese-zinc ferrite production process comprising a maximum temperature holding step for firing and a cooling step in a nitrogen atmosphere. The nitrogen atmosphere changeover temperature T in the cooling step is below 1,1500° C. and equal to or higher than 1,0000° C., and the cooling rate V1 conforms to the condition defined by:

$$T \leq (V1 + 1{,}450)/1.5 \qquad (1)$$

Here T is the nitrogen atmosphere changeover temperature in ° C. and V1 is the cooling rate in ° C./hour from T down to 900° C.

9 Claims, 1 Drawing Sheet

MN-ZN FERRITE PRODUCTION PROCESS, MN-ZN FERRITE, AND FERRITE CORE FOR POWER SUPPLIES

BACKGROUND OF THE INVENTION

1. Field of the Invention

The present invention relates to an Mn—Zn ferrite for power cores such as those for power transformers operating at a high frequency of the order of 10 to 500 kHz in particular, and a core for power supplies made up of this ferrite.

2. Prior Art

Manganese-zinc ferrites find widespread use in the form of core materials for coils and transformers in a variety of communications systems, consumer-oriented electronic systems, etc. In recent years, however, power supplies of higher frequencies have been increasingly used and so core materials have been required to have performance fit for this purpose. Needed for switching power supplies in particular are transformers that are used with a few tens of watts in a high frequency region of 10 to 500 kHz. Besides, cores for various transformers for the purposes of motor driving, signal amplification, oscillation, etc. are in need. So far, manganese-zinc type low-loss ferrites have been used for transformer cores. However, improvements in the power losses, called core losses, of these ferrites are now demanded because the core losses are increased in a high frequency region of the order of 10 to 500 kHz. To this end various proposals have been made.

Among these proposals there is one where oxides of Si, and Ca are used with the addition thereto of oxides of tetra-valent metals such as Sn, Ti and Zr or oxides of penta-valent metals such as V, Nb and Ta. Examples of the sole or combined addition of oxides of tetra- or penta-valent metals are set forth in JP-A's 46-2880, 48-72696, 60-262404, 61-108109, 61-252609, 61-252611 and 63-222018 as well as JP-A's 01-129403, 02-54902, 03-141611, 03-163804, 03-223119, 03-248403, 03-248404, 03-248405, 03-254103, 04-55362, 04-150007, 05-198416 and 05-267040.

With these, however, it is impossible to decrease power losses at high frequencies, e.g., at 100 kHz and 100° C. Accordingly, when these conventional ferrites are used, it is difficult to reduce the size of transformers.

JP-A 06-5411 discloses an Mn—Zn ferrite comprising CaO and $SiO_2$ and further containing at least one of $Nb_2O_5$ and $V_2O_5$. The cooling rate in the sintering process is controlled to 60° C./hour to 550° C./hour inclusive in the temperature range from the temperature at which the atmosphere is changed over to 100% nitrogen to 800° C., whereby the minimum temperature for power losses can be freely regulated to 60 to 120° C. and power losses can be reduced.

However, this publication has no consideration of the temperature at which the atmosphere is changed over to 100% nitrogen, and so refers to only 1,150° C. in the example. The resultant power losses are at most 310 kW/m³ at 100° C.; they are still less than satisfactory.

An object of the present invention is to provide a process for the production of a ferrite with reduced magnetic losses and power losses, a ferrite obtained by this production process, and a core for power supplies using this ferrite.

SUMMARY OF THE INVENTION

Such an object is achieved by the following embodiments (1) to (11) of the present invention.

(1) An Mn—Zn ferrite production process comprising a maximum temperature holding step for firing and a cooling step in a nitrogen atmosphere, wherein:

a nitrogen atmosphere changeover temperature T in said cooling step is below 1,1500° C. and equal to or higher than 1,000° C., and a cooling rate V1 conforms to a condition defined by the following formula (1):

$$T \leq (V1+1,450)/1.5 \tag{1}$$

where T is the nitrogen atmosphere changeover temperature in °C. and V1 is the cooling rate in °C./hour from T down to 900° C.

(2) An Mn—Zn ferrite production process comprising a maximum temperature holding step for firing and a cooling step in a nitrogen atmosphere, wherein:

a nitrogen atmosphere changeover temperature T in said cooling step is below 1,0000° C. and equal to or higher than 900° C., and a cooling rate V1 conforms to a condition defined by the following formula (2):

$$T \leq (V1+450)/0.5 \tag{2}$$

where T is the nitrogen atmosphere changeover temperature in °C. and V1 is the cooling rate in °C./hour from T down to 900° C.

(3) The Mn—Zn ferrite production process according to (1) or (2) above, wherein said cooling rate V1 from said nitrogen atmosphere changeover temperature T down to 900° C. is 800° C./hour or less.

(4) The Mn—Zn ferrite production process according to any one of (1) to (3) above, wherein a cooling rate V2 from 900° C. down to 600° C. is 200 to 800° C./hour.

(5) The Mn—Zn ferrite production process according to any one of (1) to (4) above, wherein a maximum temperature in said maximum temperature holding step is 1,250 to 1,350° C. while a maximum temperature holding time is 2 to 7 hours.

(6) The Mn—Zn ferrite production process according to any one of (1) to (5) above, wherein:

said Mn—Zn ferrite comprises as main components 52 to 55 mol % of iron oxide as calculated on an $Fe_2O_3$ basis and 7 to 12 mol % of zinc oxide as calculated on a ZnO basis with the balance being manganese oxide, and contains as subordinate components 60 to 140 ppm of silicon oxide as calculated on an $SiO_2$ basis, 350 to 700 ppm of calcium oxide as calculated on a CaO basis and 100 to 350 ppm of niobium oxide as calculated on an $Nb_2O_5$ basis.

(7) The Mn—Zn ferrite production process according to (6) above, wherein zirconium oxide is contained as an additional subordinate component in an amount of 50 to 350 ppm as calculated on a $ZrO_2$ basis with respect to said main components.

(8) The Mn—Zn ferrite production process according to (6) or (7) above, wherein nickel oxide is contained as a further subordinate component in an amount of 0 to 4,500 ppm, exclusive of 0, as calculated on an NiO basis with respect to said main components.

(9) The Mn—Zn ferrite production process according to any one of (6) to (8) above, wherein a phosphorus content is 30 ppm or less as calculated on a P basis with respect to said main components.

(10) The Mn—Zn ferrite obtained by any one of the processes recited in (1) to (9) above, and according to any one of (1) to (5) above, wherein a power loss of 280 kW/m³ or less is achieved at an applied AC magnetic field of 100 kHz and 200 mT, as measured at a temperature of 100° C.

(11) A ferrite core for power supplies, made up of the Mn—Zn ferrite according to (10) above.

EMBODIMENTS OF THE INVENTION

Figure 1:
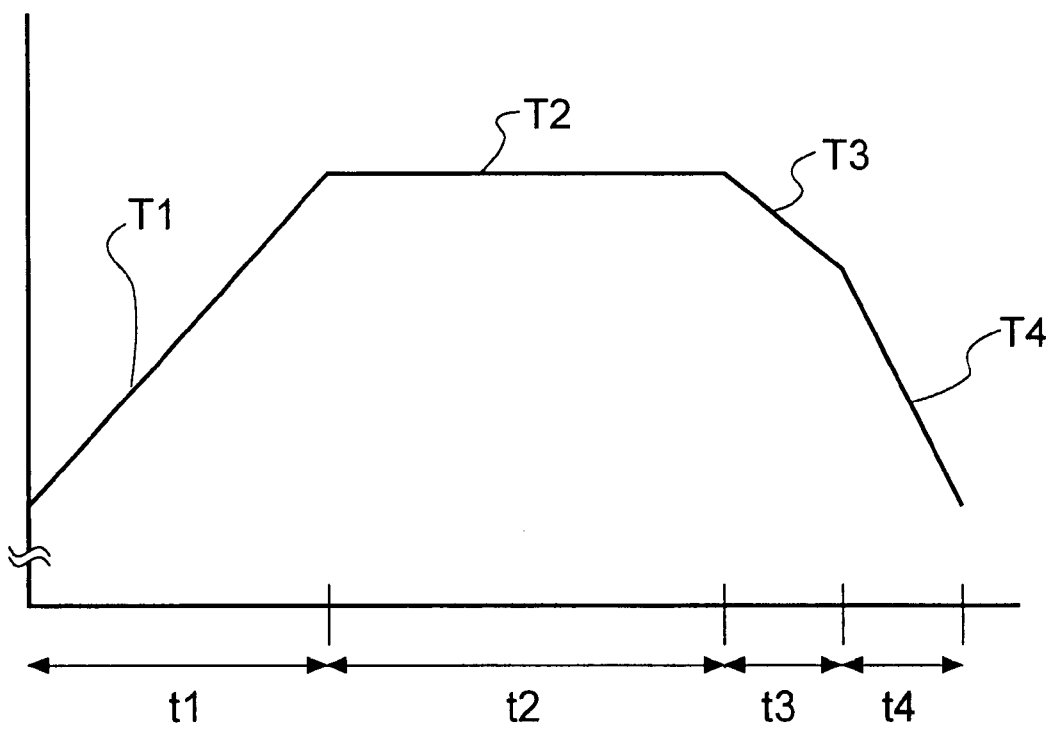
FIG. 1 is a schematic representation of the temperature conditions for the production steps according to the present invention.

Specific embodiments of the present invention are now explained in great detail. The present invention provides an Mn-Zn ferrite production process comprising a maximum temperature holding step for firing and a cooling step in a nitrogen atmosphere, wherein a nitrogen atmosphere changeover temperature T (at which the atmosphere is changed over to a nitrogen atmosphere) in said cooling step is below 1,150° C. and equal to or higher than 1,000° C., and a cooling rate V1 conforms to a condition defined by the following formula (1):

$$T \leq (V1+1,450)/1.5 \qquad (1)$$

where T is the nitrogen atmosphere changeover temperature in ° C and V1 is the cooling rate in ° C./hour from T down to 900° C.

Alternatively, the nitrogen atmosphere changeover temperature T in the cooling step may be below 1,0000° C. and equal to or higher than 900° C., and the cooling rate V1 may conform to a condition defined by the following formula (2):

$$T \leq (V1+450)/0.5 \qquad (2)$$

where T is the nitrogen atmosphere changeover temperature in ° C. and V1 is the cooling rate in ° C./hour from T down to 900° C.

Preferably, the cooling rate Vi from the nitrogen atmosphere changeover temperature T down to 900° C. should be 800° C./hour or less, and the cooling temperature V2 from 900° C. down to 600° C. should be 200 to 800° C./hour.

Thus, if the atmosphere is changed over to a nitrogen atmosphere at a given range of temperature upon transition from the high temperature holding step for firing to the cooling step and the cooling rate is controlled to a certain range, then the core loss of the Mn—Zn ferrite can be drastically reduced.

In what follows, the Mn—Zn ferrite production process of the present invention will be explained in further detail. The Mn-Zn ferrite of the invention comprises manganese oxide, zinc oxide and iron oxide as its main components, and contains silicon oxide, calcium oxide, nickel oxide, niobium oxide, and zirconium oxide as its subordinate components.

For the starting material for the main components, oxides, or compounds that can be converted by heating into oxides are used in powdery forms. To be more specific, iron oxide powders, manganese oxide powders, manganese carbonate powders, zinc oxide powders, etc. may be used. Such powders are mixed together and then calcined, and the resultant product is pulverized to a mean particle diameter of the order of 1 to 3 μm. Calcination may be carried out at a given temperature in the range of 800 to 1,000° C. in the air.

For the starting material for the subordinate components, oxides, or compounds that can be converted by heating into oxides are usually used in powdery forms. In some cases, however, it is acceptable to use powders of metals that are metal elements constituting the subordinate components.

The mixing ratio of the main components with the subordinate components should be determined depending on the end composition. The starting materials for the main and subordinate components may be mixed together either before or after the aforesaid calcination.

The present invention is not limited to the aforesaid starting material for the main components; powders of a composite oxide containing two or more metals may be used for the starting material for the main components. Usually, such composite oxide powders are prepared by the oxidative roasting of chlorides. By the oxidative roasting of an aqueous solution containing iron chloride, manganese chloride and zinc chloride as examples, powders of a composite oxide containing Fe, Mn and Zn are obtainable. Usually, this composite oxide contains a spinel phase. However, zinc chloride is susceptible to composition variations because of its high vapor pressure. To avoid this, the starting material for the main components should preferably be prepared by preparing powders of a composite oxide containing Fe and Mn using an aqueous solution containing iron chloride and manganese chloride, and then mixing the powders with zinc oxide powders or zinc ferrite powders. When the composite oxide powders prepared by the oxidative roasting process are used for the starting material for the main components, the aforesaid calcination may be dispensed with.

Then, a small amount of a suitable binder, e.g., polyvinyl alcohol, is added to a mixture of the starting materials for the main and subordinate components, which is then reduced by a spray dryer or the like to granules having a diameter of the order of 80 to 200 μm. Following this, the granules are formed and then usually fired in an atmosphere with a controlled oxygen concentration and at a given temperature that is preferably in the range of 1,250 to 1,350° C., thereby obtaining a ferrite.

Referring to FIG. 1 illustrative of temperature changes found at the firing step, the heating rate T1/t1 to the sintering temperature, i.e., the maximum temperature is preferably 100 to 700° C./hour, and more preferably 100 to 500° C./hour.

The maximum temperature at the maximum temperature holding step T2 is preferably 1,250 to 1,350° C., especially 1,270 to 1,330° C., and the maximum temperature holding time t2 is preferably 2 to 7 hours, especially 3 to 6 hours. When the maximum temperature exceeds the upper limit, magnetic losses and power losses increase due to over-sintering, and when it does not reach the lower limit, magnetic losses and power losses increase due to under-sintering. When the maximum temperature holding time exceeds the upper limit, magnetic losses and power losses increase due to over-sintering, and when it does not reach the lower limit, magnetic losses and power losses increase due to under-sintering.

It is desired that the heating step T1 be carried out at a partial pressure of oxygen ($O_2$) of preferably 2% or less, and more preferably 0.5% or less, and the maximum temperature holding step T2 be carried out at a partial pressure of oxygen ($O_2$) of preferably 2.0 to 8.5%.

Upon the completion of the maximum temperature holding step T2, the cooling step is carried out. The cooling step comprises two stages, i.e., an initial cooling stage T3 and a cooling stage T4 carried out in a nitrogen atmosphere.

The initial cooling stage T3 is a transition stage from the maximum temperature holding step to the cooling step in the nitrogen atmosphere. Crystal grain diameter, etc. are controlled at the maximum temperature holding step T2 and initial cooling stage T3.

When the nitrogen atmosphere changeover temperature T at the cooling step of the present invention is below 1,150° C. and equal to or higher than 1,000° C., and especially 1,100 to 1,050° C., the cooling rate V1 should conform to the condition defined by the following formula (1):

$$T \leq (V1+1{,}450)/1.5 \qquad (1)$$

where T is the nitrogen atmosphere changeover temperature in ° C. and V1 is the cooling rate in ° C./hour from T down to 900° C.

Alternatively, when the nitrogen atmosphere changeover temperature T at the cooling step is below 1,000° C. and equal to or higher than 900° C., the cooling rate V1 should conform to the condition defined by the following formula (2):

$$T \leq (V1+450)/0.5 \qquad (2)$$

where T is the nitrogen atmosphere changeover temperature in ° C. and V1 is the cooling rate in ° C./hour from T down to 900° C.

When the changeover temperature to the nitrogen atmosphere deviates from the aforesaid range, magnetic losses and power losses increase.

During the cooling step in the nitrogen atmosphere, it is desired that the cooling rate V1 from the nitrogen atmosphere changeover temperature T down to 900° C. be 800° C./hour or less, and especially 600° C./hour or less. At a cooling rate exceeding the upper limit, cracks are likely to occur upon firing.

Furthermore, it is desired that the cooling rate V2 from 900° C. down to 600° C., and especially from 900° C. down to 700° C. be 200 to 800° C./hour, and especially 250 to 700° C.

By controlling the first cooling rate V1 in the nitrogen atmosphere in such a way that it is kept within the given range, and preferably by controlling the second cooling rate V2, it is thus possible to reduce magnetic losses and power losses drastically. The partial pressure of oxygen ($O_2$) in the nitrogen atmosphere is preferably 0.05% or less, and especially 0.02% or less.

A possible explanation of why the reductions in magnetic losses and power losses are achievable could be that such a cooling step as mentioned above enables the subordinate components, especially calcium, silicon and niobium to segregate at grain boundaries in the ferrite at high concentrations.

The Mn—Zn ferrite of the present invention comprises as its main components manganese oxide, zinc oxide and iron oxide. Preferably, this Mn—Zn ferrite comprises:

52 to 55 mol %, especially 52.5 to 54.5 mol % of iron oxide as calculated on an $Fe_2O_3$ basis, and 7 to 12 mol %, especially 8 to 11 mol % of zinc oxide as calculated on an ZnO basis, with the balance being manganese oxide. Any deviation from this range will increase power losses. It will also cause the decline of Bm and/or $\mu i$ within the high frequency range, as well as causing the increase of Br.

The subordinate components should preferably be used at the following weight ratio with respect to the main components.

The Mn—Zn ferrite of the present invention should contain:

silicon oxide in an amount of 60 to 140 ppm, and especially 80 to 120 ppm, as calculated on an $SiO_2$ basis, calcium oxide in an amount of 350 to 700 ppm, and especially 400 to 600 ppm, as calculated on a CaO basis, and niobium oxide in an amount of 100 to 350 ppm, and especially 150 to 300 ppm, as calculated on an $Nb_2O_5$ basis.

The addition of silicon oxide and calcium oxide in such ranges ensures that electric resistance increases with decreasing magnetic losses and power losses. Any deviation of the silicon oxide content in particular from the aforesaid range causes magnetic losses to increase due to abnormal grain growth during firing. The addition of niobium oxide in such a range ensures that power losses decrease.

The ferrite of the present invention should preferably contain as an additional subordinate zirconium oxide in an amount of 50 to 350 ppm, and especially 50 to 200 ppm, as calculated on a $ZrO_2$ basis. The addition of zirconium oxide in such a range ensures a reduction in power losses.

The ferrite of the present invention should preferably contain as a further subordinate component nickel oxide in an amount of 0 to 4,500 ppm (exclusive of 0), and especially 50 to 3,000 ppm, as calculated on an NiO basis. When the nickel oxide content deviates from the aforesaid range, magnetic anisotropy increases with increases in magnetic losses and power losses.

In addition to these subordinate components, the ferrite of the present invention may contain trace element inclusions and impurity elements derived from the starting materials. Such elements, for instance, include P, B, Al, Cu, Li, Na, K, In and Bi. To prevent these elements from having an adverse influence on power losses and magnetic properties, the weight ratio of each of the elements with respect to the main components should preferably be 200 ppm or less (0 to 200 ppm). In particular, the weight ratio of P with respect to the main components should be preferably 30 ppm or less, more preferably 0 to 20 ppm, and even more preferably 0 to 10 ppm because P has large influences on power losses and magnetic properties, and the weight ratio of B with respect to the main components should be preferably 0 to 50 ppm, and more preferably 0 to 30 ppm, so that substantial improvements can be achieved in terms of Br, AB, pa and losses.

The ferrite of the present invention should have a mean crystal grain diameter of preferably 8 to 30 $\mu$m, and more preferably 8 to 20 $\mu$m. Too small a mean crystal grain diameter results in increased hysteresis losses while too large a mean crystal grain diameter results in increased eddy-current losses.

With the ferrite of the present invention, power losses at 100° C. can be reduced to 280 $kW/m^3$ or less, often 260 $kW/m^3$ or less, and sometimes 250 $kW/m^3$ or less at an applied sine-wave AC magnetic field of 100 kHz (with a maximum value of 200 mT). Hysteresis losses are proportional to frequency and eddy-current losses are proportional to the square of frequency. With the ferrite of the present invention, however, no significant increase in power losses is found even in a high frequency region exceeding 100 kHz, because the ferrite has relatively small eddy-current losses at 100 kHz.

A core for power transformers, made up of such a ferrite, is operating at a frequency of 10 to 500 kHz and a temperature of the order of 80 to 110° C., and the necessary power is usually of the order of 1 to 100 W.

EXAMPLE

The present invention will now be explained more specifically with reference to some examples of the invention.

Example 1

A ferrite core sample having such composition as recited below was prepared. For the starting materials for the main components $Fe_2O_3$, $Mn_3O_4$ and ZnO were used. These materials were wet mixed together, then dried by means of a spray dryer, and finally calcined at 900° C. for 2 hours.

Next, the calcined product for the main components was mixed with the starting materials for the subordinate components, for which $SiO_2$, $CaCO_3$, $Nb_2O_5$, $ZrO_2$ and NiO were used. The starting materials for the subordinate components were added to and mixed under pulverization with the calcined product for the main components. Pulverization was carried out until the mean particle diameter of the calcined product came to about 2 μm. The obtained mixture, with the addition of a binder thereto, was granulated by means of a spray dryer to a means particle diameter of 150 μm, then formed, and finally fired in an atmosphere with a controlled partial pressure of oxygen and under the cooling conditions (T and V1) in a nitrogen atmosphere, shown in Table 1, thereby obtaining a toroidal sample of 31 mm in outside diameter, 19 mm in inside diameter and 8 mm in height. It is here noted that the maximum temperature holding step was carried out at 1,300° C. for 5 hours.

$Fe_2O_3$: 53.2 mol %
MnO: 37.4 mol %
ZnO: 9.4 mol %
$SiO_2$: 100 ppm
CaO: 500 ppm
$Nb_2O_5$: 250 ppm
$ZrO_2$: 100 ppm
NiO: 1,200 ppm The ratio of component elements in the sample were measured by X-ray fluorescence analysis. By comparison, the ratio of component elements was found to be equivalent to that of the starting composition. The samples shown in Table 1 were all found by absorptiometry to have P contents of 30 ppm or less. It is here believed that P was derived from the starting oxides such as iron oxide.

At an applied sine-wave AC magnetic field of 100 kHz and 200 mT (maximum value), each sample was measured for core losses (Pcv) at 100° C. The results are set out in Table 1.

TABLE 1

| Sample No. | T ° C. | V1 ° C./hr | Tmin ° C. | Pcv at Tmin kW/m³ |
|---|---|---|---|---|
| 1. (comp.) | 1150 | 400 | 100 | 317 |
| 2 (inventive) | 1100 | 600 | 100 | 242 |
| 3 (inventive) | 1100 | 300 | 100 | 245 |
| 4 (comp.) | 1100 | 150 | 100 | 290 |
| 5 (inventive) | 1050 | 400 | 100 | 244 |
| 6 (inventive) | 1050 | 200 | 100 | 255 |
| 7 (comp.) | 1050 | 100 | 100 | 292 |
| 8 (inventive) | 1000 | 200 | 100 | 251 |
| 9 (inventive) | 1000 | 100 | 100 | 247 |
| 10 (comp.) | 1000 | 10 | 100 | 289 |
| 11 (inventive) | 950 | 50 | 100 | 262 |
| 12 (comp.) | 950 | 10 | 100 | 287 |
| 13 (comp.) | 850 | — | 100 | 332 |

Tmin: Core Loss Min. Temp.
Pcv: Core Loss

As can be seen from Table 1, the inventive samples were all more reduced in terms of core losses than the comparative samples.

Example 2

Samples were prepared as in Example 1 with the exception that after the first cooling stage, the second cooling stage was carried out under the conditions (V2) shown in Table 2. It is here noted that the first cooling stage was carried out under the same condition (V1) as in sample No. 3 of Example 1.

The core losses of the obtained samples were measured as in Example 1. The results are set out in Table 2.

TABLE 2

| Sample No. | V2 ° C./hr | Tmin ° C. | Pcv at Tmin kW/m³ |
|---|---|---|---|
| 14 (comp.) | 100 | 100 | 296 |
| 15 (inventive) | 300 | 100 | 237 |
| 16 (inventive) | 500 | 100 | 245 |
| 17 (inventive) | 700 | 100 | 273 |

Tmin: Core Loss Min. Temp.
Pcv: Core Loss

Example 3

Samples were prepared as in Example 1 with the exception that the maximum temperature holding step was carried out under the conditions shown in Table 3. It is here noted that the first cooling stage was carried out under the same condition (V1) as in sample No. 3 of Example 1 and the second cooling stage was carried out under the same condition (V2) as in sample No. 15 of Example 2.

The core losses of the obtained samples were measured as in Example 1. The results are set out in Table 3.

TABLE 3

| Sample No. | Max. Temp. ° C./hr | Max. Temp.* hr | Tmin ° C. | Pcv at Tmin kW/m³ |
|---|---|---|---|---|
| 18 (comp.) | 1200 | 5 | 100 | 293 |
| 19 (comp.) | 1300 | 1 | 100 | 329 |
| 20 (inventive) | 1300 | 5 | 100 | 237 |
| 21 (comp.) | 1300 | 8 | 100 | 308 |
| 22 (comp.) | 1400 | 5 | 100 | 414 |

Max. Temp.*: Maximum Temperature Holding Time
Tmin: Core Loss Min. Temp.
Pcv: Core Loss Example 4

Samples were prepared as in Example 1 with the exception that the compositions shown in Table 4 were used. It is here noted that the first cooling stage was carried out under the same condition (Vi) as in sample No. 3 of Example 1, and the second cooling stage was carried out under the same condition (V2) as in sample No. 15 of Example 2.

The core losses of the obtained samples were measured as in Example 1. The results are set out in Table 4.

TABLE 4

| Sample No. | $SiO_2$ ppm | CaO ppm | $Nb_2O_5$ ppm | $ZrO_2$ ppm | NiO ppm | Tmin ° C. | Pcv at Tmin kW/m³ |
|---|---|---|---|---|---|---|---|
| 23 (comp.) | 40 | 500 | 250 | 0 | 0 | 100 | 456 |
| 24 (inventive) | 100 | 500 | 250 | 0 | 0 | 100 | 267 |
| 25 (comp.) | 200 | 500 | 250 | 0 | 0 | 100 | 411 |
| 26 (comp.) | 100 | 250 | 250 | 0 | 0 | 100 | 477 |
| 27 (comp.) | 100 | 800 | 250 | 0 | 0 | 100 | 359 |
| 28 (comp.) | 100 | 500 | 0 | 0 | 0 | 100 | 324 |
| 29 (comp.) | 100 | 500 | 500 | 0 | 0 | 100 | 348 |
| 30 (inventive) | 100 | 500 | 250 | 100 | 0 | 100 | 256 |
| 31 (comp.) | 100 | 500 | 250 | 500 | 0 | 100 | 310 |
| 32 (inventive) | 100 | 500 | 250 | 0 | 100 | 100 | 263 |

TABLE 4-continued

| Sample No. | SiO₂ ppm | CaO ppm | Nb₂O₅ ppm | ZrO₂ ppm | NiO ppm | Tmin ° C. | Pcv at Tmin kW/m³ |
|---|---|---|---|---|---|---|---|
| 33 (inventive) | 100 | 500 | 250 | 0 | 1200 | 100 | 252 |
| 34 (comp.) | 100 | 500 | 250 | 0 | 5500 | 100 | 303 |
| 35 (inventive) | 100 | 500 | 250 | 100 | 1200 | 100 | 240 |

Tmin: Core Loss Min. Temp.
Pcv: Core Loss

Example 5

Samples were prepared as in Example 1 with the exception that the P contents shown in Table 5 were obtainable. It is here noted that the first cooling stage was carried out under the same condition (V1) as in sample No. 3 of Example 1, and the second cooling stage was carried out under the same condition (V2) as in sample No. 15 of Example 2.

The core losses of the obtained samples were measured as in Example 1. The results are set out in Table 5.

TABLE 5

| Sample No. | | P ppm | Tmin ° C. | Pcv at Tmin kW/m³ |
|---|---|---|---|---|
| 36 | (inventive) | 2 | 100 | 238 |
| 37 | (inventive) | 5 | 100 | 240 |
| 38 | (inventive) | 15 | 100 | 265 |
| 39 | (comp.) | 40 | 100 | 312 |

Tmin: Core Loss Min. Temp.
Pcv: Core Loss

From the foregoing results, the effects of the present invention are evident.

ADVANTAGES OF THE INVENTION

According to the present invention as detailed above, it is possible to provide a process for the production of a ferrite reduced in terms of magnetic losses and power losses, a ferrite obtained by this production process, and a core for power supplies using this ferrite.

Japanese Patent Application Nos. 096885/2000 and 002772/2001 are herein incorporated by reference.

Although some preferred embodiments of the invention have been described, many modifications and variations may be made thereto in the light of the above teachings. It is therefore to be understood that within the scope of the appended claims, the invention may be practiced otherwise than as specifically described.

What we claim is:

1. An Mn—Zn ferrite production process comprising a maximum temperature holding step for firing and a cooling step in a nitrogen atmosphere, wherein:
   a nitrogen atmosphere changeover temperature T in said cooling step is below 1,1500° C. and equal to or higher than 1,0000° C., and a cooling rate V1 conforms to a condition defined by the following formula (1):

$$T \leq (V1 + 1{,}450)/1.5 \tag{1}$$

where T is the nitrogen atmosphere changeover temperature in ° C. and V1 is the cooling rate in ° C./hour from T down to 900° C.

2. An Mn—Zn ferrite production process comprising a maximum temperature holding step for firing and a cooling step in a nitrogen atmosphere, wherein:
   a nitrogen atmosphere changeover temperature T in said cooling step is below 1,000° C. and equal to or higher than 900° C., and a cooling rate V1 conforms to a condition defined by the following formula (2):

$$T \leq (V1 + 450)/0.5 \tag{2}$$

where T is the nitrogen atmosphere changeover temperature in ° C. and V1 is the cooling rate in ° C./hour from T down to 900° C.

3. The Mn—Zn ferrite production process according to claim 1, wherein said cooling rate V1 from said nitrogen atmosphere changeover temperature T down to 900° C. is 800° C./hour or less.

4. The Mn—Zn ferrite production process according to claim 1, wherein a cooling rate V2 from 900° C. down to 600° C. is 200 to 800° C./hour.

5. The Mn—Zn ferrite production process according to claim 1, wherein a maximum temperature in said maximum temperature holding step is 1,250 to 1,350° C. while a maximum temperature holding time is 2 to 7 hours.

6. The Mn—Zn ferrite production process according to claim 1, wherein:
   said Mn—Zn ferrite comprises as main components 52 to 55 mol % of iron oxide as calculated on an Fe₂O₃ basis and 7 to 12 mol % of zinc oxide as calculated on a ZnO basis with the balance being manganese oxide, and contains as subordinate components 60 to 140 ppm of silicon oxide as calculated on an SiO₂ basis, 350 to 700 ppm of calcium oxide as calculated on a CaG basis and 100 to 350 ppm of niobium oxide as calculated on an Nb₂O₅ basis.

7. The Mn—Zn ferrite production process according to claim 6, wherein zirconium oxide is contained as an additional subordinate component in an amount of 50 to 350 ppm as calculated on a ZrO₂ basis with respect to said main components.

8. The Mn—Zn ferrite production process according to claim 6, wherein nickel oxide is contained as a further subordinate component in an amount of 0 to 4,500 ppm, exclusive of 0, as calculated on an NiO basis with respect to said main components.

9. The Mn—Zn ferrite production process according to claim 6, wherein a phosphorus content is 30 ppm or less as calculated on a P basis with respect to said main components.

* * * * *

UNITED STATES PATENT AND TRADEMARK OFFICE
CERTIFICATE OF CORRECTION

PATENT NO. : 6,627,103 B2
DATED : September 30, 2003
INVENTOR(S) : Katsushi Yasuhara et al.

It is certified that error appears in the above-identified patent and that said Letters Patent is hereby corrected as shown below:

Title page,
Item [75], Inventors, "Katsushi Yasuhara, Chuo-ku (JP); Kenya Takagawa, Chuo-ku (JP)" should read -- Katsushi Yasuhara, Tokyo (JP); Kenya Takagawa, Tokyo (JP) --.

Column 10,
Line 41, "CaG" should read -- CaO --.

Signed and Sealed this

Fourth Day of May, 2004

JON W. DUDAS
*Acting Director of the United States Patent and Trademark Office*